United States Patent
Stewart

(10) Patent No.: US 9,790,913 B2
(45) Date of Patent: Oct. 17, 2017

(54) PITCH AND HEAVE DRIVEN WAVE ENERGY CONVERTER SYSTEM INCLUDING CABLE SUPPORTED REACTION MASSES

(75) Inventor: David B. Stewart, Cranbury, NJ (US)

(73) Assignee: Ocean Power Technologies, Inc., Pennington, NJ (US)

( * ) Notice: Subject to any disclaimer, the term of this patent is extended or adjusted under 35 U.S.C. 154(b) by 1028 days.

(21) Appl. No.: 13/428,877

(22) Filed: Mar. 23, 2012

(65) Prior Publication Data

US 2012/0248774 A1  Oct. 4, 2012

Related U.S. Application Data

(60) Provisional application No. 61/516,004, filed on Mar. 28, 2011, provisional application No. 61/516,003, filed on Mar. 28, 2011, provisional application No. 61/516,025, filed on Mar. 28, 2011.

(51) Int. Cl.
| | |
|---|---|
| F03B 13/14 | (2006.01) |
| F03B 13/16 | (2006.01) |
| F03B 13/20 | (2006.01) |
| F03B 11/00 | (2006.01) |

(52) U.S. Cl.
CPC ............. *F03B 13/16* (2013.01); *F03B 11/00* (2013.01); *F03B 13/20* (2013.01); F05B 2260/406 (2013.01); Y02E 10/226 (2013.01); Y02E 10/38 (2013.01)

(58) Field of Classification Search
CPC .......... F03B 13/10; F03B 13/14; F03B 11/00; F03B 13/16; F03B 13/20; F05B 2260/406; Y02E 10/226; Y02E 10/38

USPC .......................................................... 290/53
See application file for complete search history.

(56) References Cited

U.S. PATENT DOCUMENTS

| | | | | |
|---|---|---|---|---|
| 4,145,885 A * | 3/1979 | Solell | ................. | F03B 13/1855 290/53 |
| 4,266,143 A * | 5/1981 | Ng | ......................... | F03B 13/20 290/42 |
| 4,352,023 A * | 9/1982 | Sachs | ...................... | F03B 13/20 290/42 |
| 4,851,704 A * | 7/1989 | Rubi | ...................... | F03B 13/20 290/53 |
| 7,436,082 B2 * | 10/2008 | Ruse | ................... | F03B 13/1875 290/42 |

(Continued)

*Primary Examiner* — Tulsidas C Patel
*Assistant Examiner* — S. Mikailoff
(74) *Attorney, Agent, or Firm* — Derek V. Forinash; Porter Hedges LLP

(57) ABSTRACT

A wave energy converter (WEC) buoy includes at least one pitch-driven WEC ("PDWEC") device. Each PDWEC device includes two reaction masses which are placed at diametrically opposite ends of a container designed to float along the surface of a body of water and to move in response to the pitching motion of the waves. The reaction masses are interconnected so that when one reaction mass moves up, the diametrically opposed reaction mass moves down, and vice-versa. The movement of the reaction masses drives power take off (PTO) devices to produce useful energy. The reaction masses may be interconnected by any suitable linking system. One or more PDWEC device may be combined with a heave responsive device to produce a WEC buoy which can produce a power output in response to pitch or heave motion.

17 Claims, 19 Drawing Sheets

(56) References Cited

U.S. PATENT DOCUMENTS

| | | | |
|---|---|---|---|
| 7,443,046 B2 * | 10/2008 | Stewart et al. | 290/53 |
| 7,629,704 B2 * | 12/2009 | Hench | 290/53 |
| 7,989,975 B2 * | 8/2011 | Clement | F03B 13/20 290/53 |
| 8,067,849 B2 * | 11/2011 | Stewart | 290/53 |
| 8,198,745 B2 * | 6/2012 | Laz et al. | 290/53 |
| 8,269,365 B2 * | 9/2012 | Clement et al. | 290/53 |
| 8,350,394 B2 * | 1/2013 | Cottone | H01L 41/125 290/1 E |
| 8,476,782 B2 * | 7/2013 | Chi | F03B 13/1855 290/53 |
| 8,487,459 B2 * | 7/2013 | Eder et al. | 290/42 |
| 8,723,351 B2 * | 5/2014 | Stewart et al. | 290/53 |
| 8,766,470 B2 * | 7/2014 | Beane | 290/53 |
| 8,841,788 B2 * | 9/2014 | Sampaio | F03B 13/16 290/42 |
| 9,617,972 B1 * | 4/2017 | Skaf | F03B 13/20 |
| 2007/0273156 A1 * | 11/2007 | Miyajima | F03B 13/20 290/53 |
| 2009/0146429 A1 * | 6/2009 | Protter et al. | 290/53 |
| 2009/0160191 A1 * | 6/2009 | Beane | 290/53 |
| 2009/0236856 A1 * | 9/2009 | Jin | F03G 3/00 290/54 |
| 2009/0243298 A1 * | 10/2009 | Jean et al. | 290/53 |
| 2010/0064678 A1 * | 3/2010 | Cucurella Ripoli | F03B 13/1815 60/501 |
| 2011/0012368 A1 * | 1/2011 | Hahmann | F03B 13/187 290/1 C |
| 2011/0089689 A1 * | 4/2011 | Gregory | 290/42 |
| 2012/0001432 A1 * | 1/2012 | Clement | F03B 13/20 290/53 |
| 2012/0153624 A1 * | 6/2012 | Sampaio | 290/53 |

* cited by examiner

PITCH AND HEAVE DRIVEN WAVE ENERGY CONVERTER SYSTEM INCLUDING CABLE SUPPORTED REACTION MASSES

This invention claims priority based on the following provisional applications whose teachings are incorporated herein by reference: (a) provisional application Ser. No. 61/516,004 filed Mar. 28, 2011 and titled PITCH DRIVEN WAVE ENERGY CONVERTER (PDWEC); (b) provisional application Ser. No. 61/516,003 filed Mar. 28, 2011 and titled MULTI-MODE WAVE ENERGY CONVERTER SYSTEM; and (c) provisional application Ser. No. 61/516,025 filed Mar. 28, 2011 and titled HYDRAULIC SPRING.

BACKGROUND OF THE INVENTION

This invention relates to novel wave energy converter (WEC) devices which are responsive to waves having relatively short periods and to WEC buoys (systems) employing such devices.

The design of prior art WECs has been focused, primarily, on the development of "heave" (or up and down) wave responsive systems that are most efficient in highly energetic wave climates with high-amplitude, long-period waves (e.g. US Pacific Northwest, Europe, Australia). The expectation was that heave responsive WEC systems would first become economically viable in these locations. However, heave responsive WEC technologies are comparatively inefficient in wave climates with short period waves (e.g. eastern US, Gulf of Mexico, Hawaii, northern and western UK, Japan).

A WEC technology of interest which may be referred to as a mass-on-spring WEC or MOSWEC technology (see U.S. Pat. No. 7,443,046 and U.S. Pat. No. 8,067,849) includes the use of internal weights ("reaction masses"), attached to an outer hull/container with springs, that oscillate as the waves act upon the hull. An advantage of the MOSWEC technology is that all moving parts may be hermetically sealed in a dry-nitrogen environment, improving its survivability in the ocean environment. However, a problem with the MOSWEC technology is the implementation of the springs. They must be "soft" enough to allow the reaction masses to oscillate at a frequency near the predominant wave frequency, yet be stiff enough to maintain the reaction masses near their center of travel. When the reaction masses are very heavy (a thousand kilograms or more), known physical springs which are needed to counteract gravitational forces are not satisfactory. As a result, the MOSWEC technology is presently limited to relatively small power autonomous WEC applications.

There is a need for WEC devices which are efficient and cost effective for waves of short-period and which do not require springs to counteract gravity (as per the prior art) and for systems which incorporate such WEC devices.

SUMMARY OF THE INVENTION

Applicant's invention is directed to a novel WEC technology which may be referred to as pitch driven (PD) WEC technology and which, in its implementation, eliminates the need of springs to overcome gravitational forces. In the "pitch-driven" WEC ("PDWEC") technology, reaction masses are placed at diametrically opposite ends of a container designed to float along the surface of a body of water. The reaction masses may be connected via suitable linkages (e.g., mechanical, hydraulic, pneumatic) which cause the reaction masses to function as counterbalances to each other.

In accordance with the invention, at least two reaction masses are disposed at opposite ends of a container designed to float along the surface of a body of water and to be responsive to wave motion. The two reaction masses are interconnected to function so as to counterbalance each other, whereby when one reaction mass is driven in an upward direction the other reaction mass is driven down, in the opposite direction, and vice-versa. This enables effective oscillatory motion of the reaction masses without the need for "gravitational" springs.

The need to use springs to counteract gravitational forces is eliminated; (springs to tune the system and cause it to oscillate may still be used; but these springs may be "soft" springs or electrically effected springs.) Because of the "seesaw" behavior of each pair of reaction masses, the PDWEC devices capture energy primarily from pitch (fore and aft) and roll (side-to-side) forces and motions.

As noted above, prior art technologies, which utilize heave (up and down) forces and motions to harness wave energy, harvest energy more efficiently and effectively in response to long period waves. In contrast, in response to low-amplitude, short period waves, energy harvesting using the pitch and roll force and motion of a WEC buoy can be more efficient.

The novel WEC devices are referred to herein as "pitch-driven" wave energy converter (PDWEC) devices. The novel PDWEC devices may be housed in containers designed to enhance response to the "pitching" of the waves. The PDWEC devices are equally applicable, and responsive, to "rolling" motion of the waves when appropriately located within their container.

In the discussion to follow and in the appended claims, a "WEC system" or a "WEC buoy" is intended to refer to, and include, a container, of any suitable shape, which includes WEC devices. In WEC systems/buoys embodying the invention, there is included at least one WEC device which is primarily responsive to pitching (or rolling) of its container due to the waves.

A PDWEC device embodying the invention is designed to be primarily responsive to waves causing the plunging forward and backward ("pitching") of the WEC device and is highly efficient and cost-effective when acted upon by relatively short-period waves. The PDWEC devices embodying the invention may be housed in WEC buoys, or be part of a WEC system, which is subjected to waves causing "pitching" (or "rolling). The PDWEC devices differ from heave responsive WEC devices which are primarily responsive to waves causing a WEC buoy to heave (move) up and down.

Different types of PDWEC devices having different arrangements of paired reactions masses to enhance response to pitch and/or roll motion may be used to practice the invention.

Another aspect of the invention is directed to different shapes of the containers to enhance pitch/roll motion.

The container/hull of a WEC buoy embodying the invention may be a symmetrical or an asymmetrical structure along the horizontal plane and may be fully or partially enclosed. Symmetrical structures may be easier to design and construct. Asymmetrical structures, like a ship hull, may allow for a reduction in the number of reaction masses and PTOs, and therefore may be a better approach in some cases. If an asymmetrical structure is used, the hull will need some system to keep it pointed into the direction of the predominant waves. Pointing may be provided by a mooring, wind vane device, or active thrust device (e.g. thruster or powered propeller).

The length (L) of a WEC buoy's container/hull [and/or its width (W)] may be selected to be a ratio of the typical (average) wavelength of the waves in which it is operated. The length (or width) may range from a small fraction of a wavelength to almost a full wavelength. However, for best pitching response, the length (and/or width) of the container should be approximately equal to ½ the wave length of the waves.

The height (H) of the container may vary over a wide range (e.g., from 0.1 to 1.5 times the length of the container. The selected height of the container/hull may be a function of a variety of factors [e.g., such as desired displacement or travel distance for the reaction masses which defines the stroke, freeboard (height above water), stability and survivability].

Applicant's invention is also suitable to create a design for a utility-scale "pitch-driven" wave energy conversion ("PDWEC") system. The pitch driven devices may be used to form a "wave farm" with the outputs of the different devices being reaped and combined to provide a common output.

BRIEF DESCRIPTION OF THE DRAWINGS

In the accompanying diagrams, which are not drawn to scale, like reference characters denote like components.

DETAILED DESCRIPTION OF THE EMBODIMENTS

Figure 1:
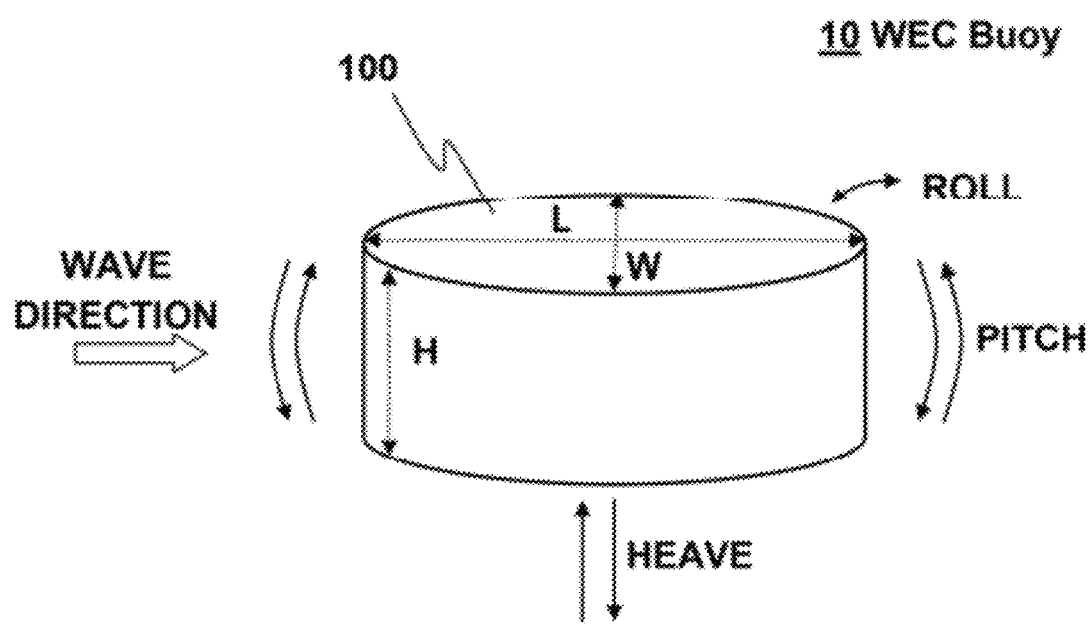
FIG. 1 is a highly simplified isometric drawing showing a container/hull of a WEC buoy which may be used to practice the invention.

FIG. 1 shows a WEC buoy 10 which includes a container 100 which may contain one or more wave energy converter (WEC) devices. The buoy has height H, width W, and length L. The buoy is designed to respond to all types of wave motion; e.g., to heave (up and down) motion, to pitch (fore and aft rocking) motion, and to roll (side to side rocking) motion. The dimensions of the height, length and width may vary over a wide range. The height "H" is designed to provide sufficient displacement (for travel path, stroke, of the reaction masses) and freeboard needed for wave energy capture. The dimensions "L" and "W" may be the same for symmetrical hulls. The dimension L may be, greater than W for asymmetrical hulls. For pitch driven asymmetrical WEC buoys, the longer side could be (or would be) oriented via passive or active means to preferably face the oncoming waves. Note that the container may be open or fully enclosed. If fully enclosed the container/hull may be a hermetically sealed structure which may be filled with some inert gas.

Pitch driven WEC (PDWEC) devices are generally responsive to pitching and to rolling motion. When positioned along the length of the container PDWECs are designed to be primarily responsive to the varying amplitude of surface waves which cause the container 100 to respond to what may be termed as a pitching or see-saw like effect. When positioned along the width of the container PDWECs are designed to be primarily responsive to the varying amplitude of surface waves which cause the container 100 to respond to what may be termed as a rolling motion.

Figure 2A:
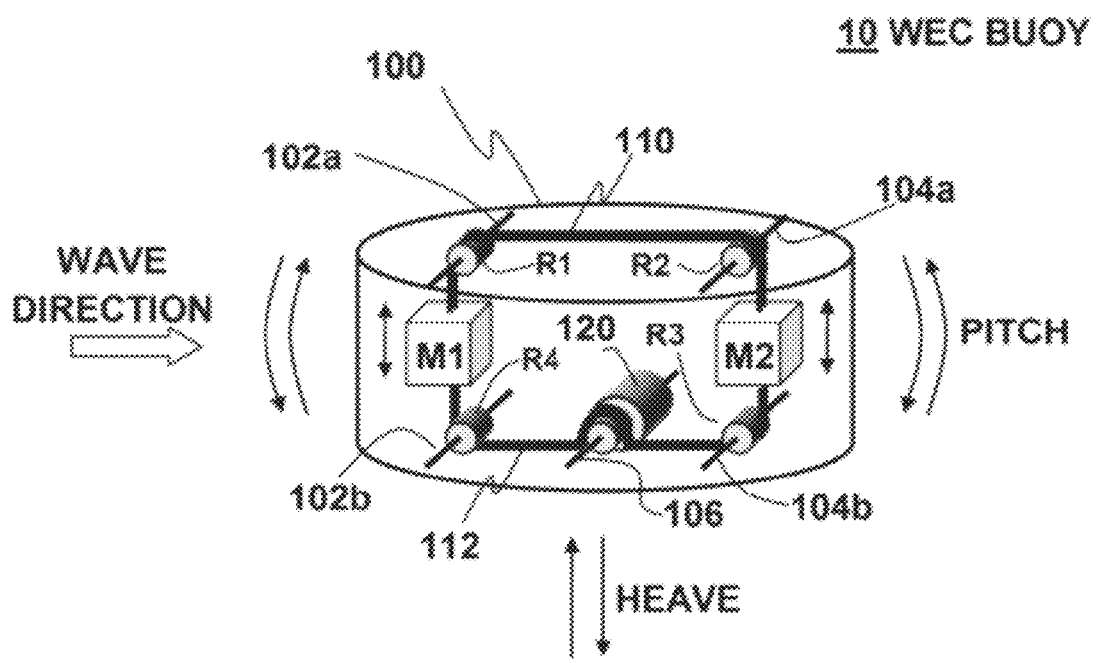
FIG. 2A is a highly simplified isometric drawing showing a PDWEC device embodying the invention mounted within a container of a WEC buoy in accordance with the invention.

FIG. 2A shows a WEC buoy 10 comprising a container 100 in which is mounted a pitch-driven WEC (PDWEC) device. The PDWEC device includes two, paired, reaction masses (M1, M2) coupled such that when one mass goes up, the other mass goes down. They function as counterbalances to each other. In FIG. 2A, reaction mass M1 is connected at its top side to one end of a cable/belt 110 which passes over a roller R1. The cable 110 extends along the length and top side of the hull 100 and passes over a roller R2 to connect to the top side of reaction mass M2. The bottom side of M2 is connected to one end of a cable/belt 112 which passes under a roller R3. The cable/belt 112 extends along the length and bottom side of the hull and around PTO, 120 (to drive it and produce power and then extends below roller R4 and is attached to the bottom side of M1. Roller R1 is mounted on, and held in place by, a shaft 102a. Similarly, roller R4 is mounted on, and held in place by, a shaft 102b. Roller R2 is mounted on, and held in place by, a shaft 104a and Roller R3 is mounted on, and held in place by, a shaft 104b. Shafts 102a, 102b, 104a, 104b may extend across the width (or length) of the container or they may be held in place by an internal support frame.

The PTO 120 is mounted on, and held in place by, a shaft 106 which is suitably supported (e.g., the shaft can extend across the width of the hull). By way of example, the PTO may include an electric generator having sprockets driven by corresponding grooves in the cable 112 (a frictional drive may be used instead). Alternatively, the PTO may be any suitable device designed to convert the relative motion of M1 and M2 into useful energy.

Figure 2B:
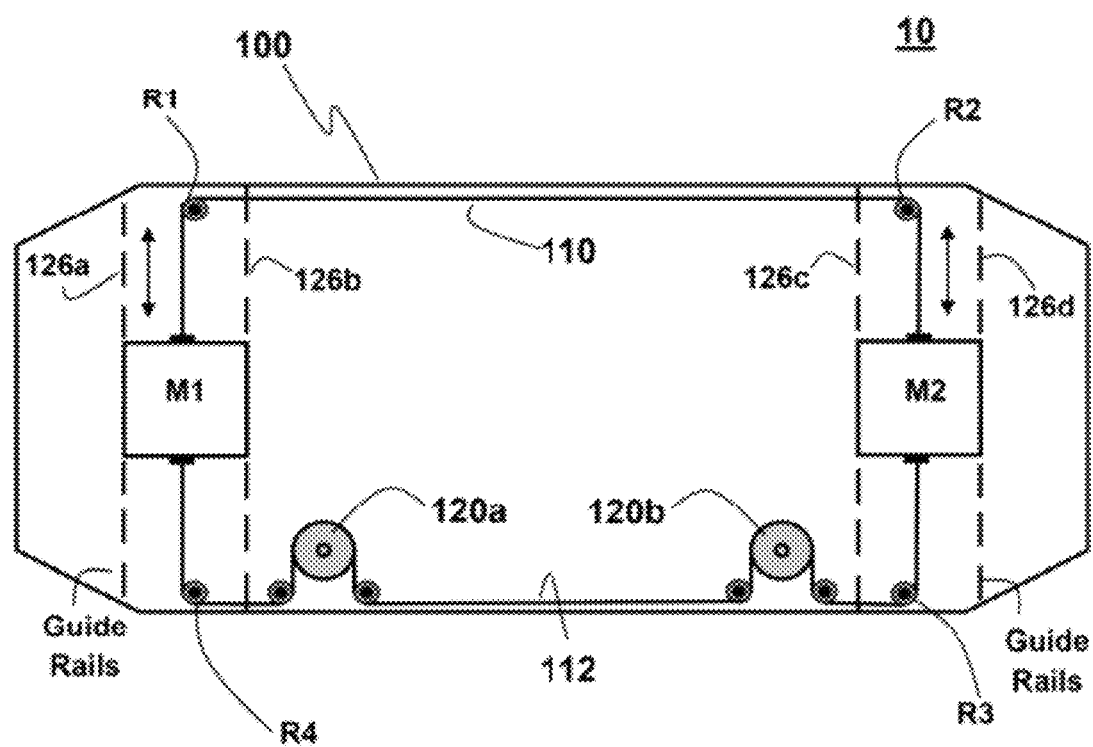
FIG. 2B is a highly simplified cross-sectional drawing showing a PDWEC device embodying the invention positioned within a container and arranged to drive two generators.

In FIG. 2B, multiple PTO devices (120a, 120b), which may be electric generators, are shown to be driven by winding a cable 112 around various sprocket/generator combinations. FIG. 2B also shows that, in practice, guide rails (126 a, b, c, d,) may be provided to ensure that the reaction masses travel up and down along a set path.

Figure 2C:
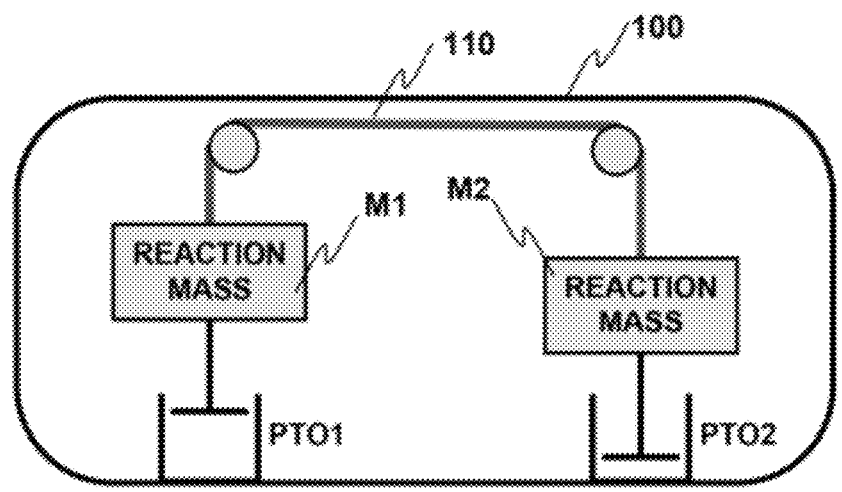
FIG. 2C is a highly simplified cross-sectional drawing showing a PDWEC device embodying the invention whose reaction masses are directly connected to a PTO in accordance with the invention.

In FIG. 2C, the top sides of the reaction masses (M1, M2) are connected to each other via belt/cable 110 and the bottom sides of the reaction masses are shown coupled to respective PTOs (PTO1 and PTO2).

Figure 2D:
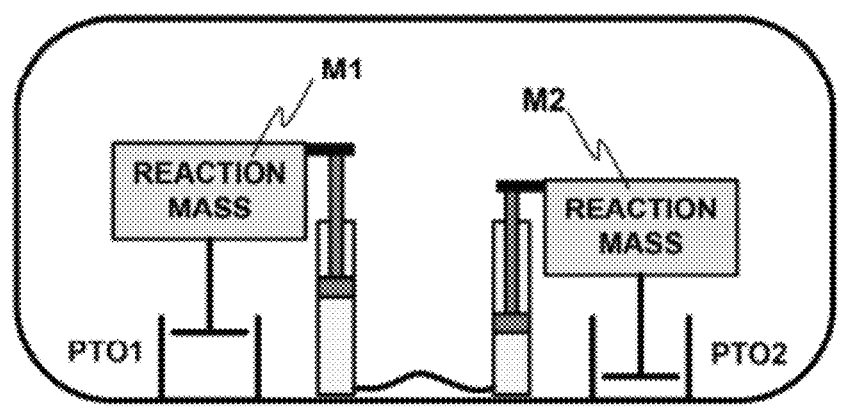
FIG. 2D is a highly simplified cross-sectional drawing showing a PDWEC device embodying the invention whose reaction masses are: (a) coupled to each other using hydraulic devices; and (b) are directly connected to PTOs in accordance with the invention.

In FIG. 2D, the reaction masses (M1, M2) are supported by hydraulic cylinders that are interconnected via hydraulic hoses such that the force exerted by one mass is coupled to the other. Power take-off devices are connected to at least one of the two reaction masses:

As shown in the figures, WEC buoys embodying the invention include paired reaction masses, M1 and M2 mounted at opposite ends of the container in a push-pull arrangement. The reaction masses are coupled to each other via a mechanical linkage such that they move in opposite direction to each other. An explanation of the operation of the PDWEC device is as follows. Due to the high inertia of the reaction masses, the reaction masses tend to stay put. However, the system includes electric generators (e.g., 120) which provide some "resistance" to motion. When the container (shell) starts moving up, a differential velocity is generated between the shell and the reaction mass. A generator control algorithm will apply an increasing back force (via torque on a pinion or pulley) as the differential velocity gets bigger. Because of the resistance provided by the generator, the reaction mass will eventually start moving with the shell. The shell will eventually stop moving because of the wave action. The reaction mass, on the other hand, is moving and will continue to move in the same direction until the generator slows it down or it hits an end stop. As the shell velocity increases in the opposite direction, the generator will apply a damping force that eventually pulls the reaction mass in the same direction as the shell motion (down in this case). This cycle will repeat with the reaction mass motion lagging the shell motion. The combination of reaction mass and spring serves to increase the relative motion of the mass and the shell forming an oscillatory system and causing the movement of the components interconnecting the reaction masse. The movement of the reaction masses causes movement of the interconnecting mechanical linkages which drives the PTO. (Alternatively, movement of the reaction masses can be used to apply forces to an associated hydraulic system to drive a PTO).

In FIGS. 2A and 2B, the paired reaction masses (M1, M2) move up and down along a vertical path between a bottom point and a top point along a set of guide rails. Stops (not shown) may be provided at the top and bottom of the guide rails to limit the excursions of the reaction masses. The reaction masses are coupled to each other and cause one, or more, power take off (PTO) mechanism to be driven so as to convert their motion and that of their coupling mechanism into useful energy (e.g., electrical energy). The reaction masses may be coupled to each other and to a PTO via a simple coupling linkage such as a cable or belt or hydraulic devices or pneumatic devices. The PTO may be a completely separate unit. Alternatively, it may be more effective to use the coupling mechanism as part of the PTO.

Figure 3:
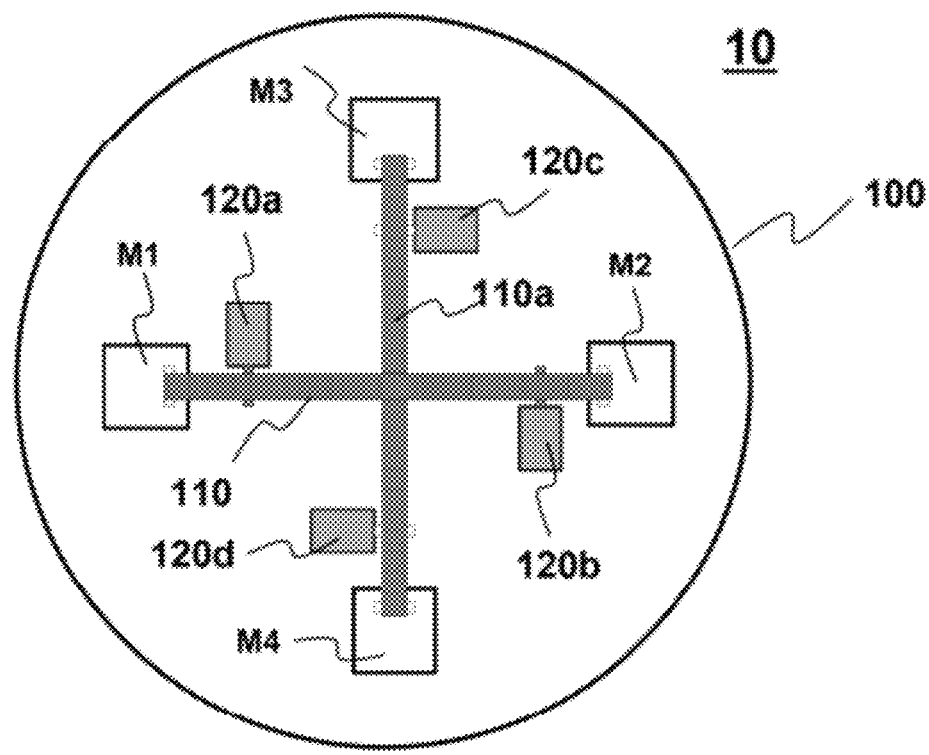
FIG. 3 is a highly simplified top view showing two sets of paired PDWEC devices embodying the invention positioned within a container.
Figure 4:
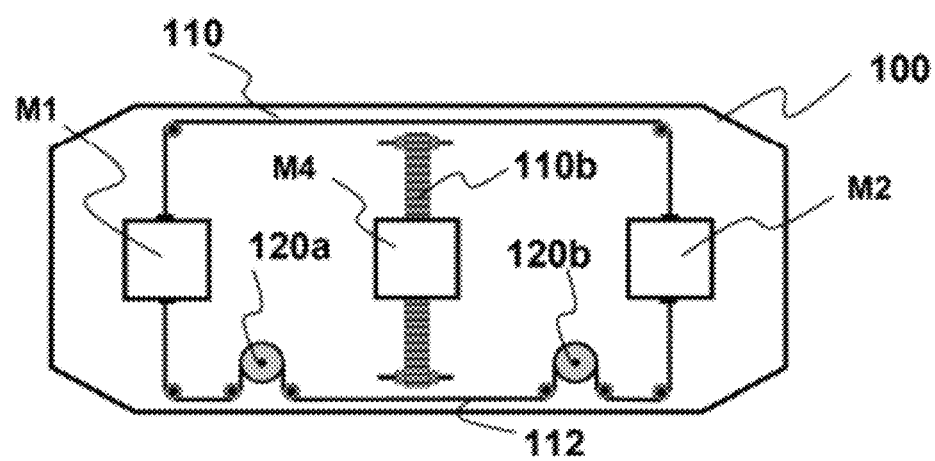
FIG. 4 is a highly simplified cross sectional drawing of the system shown in FIG. 3.

In the embodiment shown in FIGS. 3 and 4 there are two PDWEC devices, each device has 2 reaction masses and drives it's respective PTOs. FIG. 3 shows two sets of counterbalancing reaction masses M1 and M2, M3 and M4 coupled with flexible belts to form two PDWEC devices. The masses can be coupled by other devices, such as steel cables and pulleys and/or any of the other ways shown in FIG. 2C or 2D. Two or more sets of PDWEC devices mounted within the container 100 will keep the WEC buoy 10 from yawing about its vertical axis. As per the orientation shown in FIG. 3, masses M1, M2 and their associated components would respond to "pitching" motion and masses M3, M4 and their associated components would respond to "rolling" motion.

FIG. 4 shows a cross-sectional side view of the multiple PDWEC devices of FIG. 3, described above. The PTOs (or electrical generators) 120 may be located along the bottom of the can 100 and be driven as shown for 120a and 120b, or they may be located along top of the can 100 and driven by any suitable apparatus and/or arrangement. It is preferable to have more than one PDWEC device in a container. With only one set of WEC devices the WEC buoy will have a tendency to rotate parallel to the direction of the waves. However, the optimum number of PDWECs may vary as a function of various factors.

Toothed belts and pulleys (with or without sprockets) can be used to couple the diametrically-opposed reaction masses to the PTOs and to also transfer mechanical power to PTOs using permanent magnet generators. Alternatives for the mechanical linkage between masses are a cable and pulley system or a lever type system or linear or rotary hydraulic devices (e.g. hydraulic cylinders coupled with hoses) or linear or rotary pneumatic devices. If a cable and pulley system is used for the mechanical linkage, a rack-and-pinion device could be used for the PTO. Other PTOs could be used, including ball screw, direct linear electric generator, hydraulic device coupled to a rotary electric generator or a pneumatic device coupled to a rotary electric generator.

The reaction masses can be formed of steel, concrete, or a combination thereof. A concrete reaction mass with some steel for structural support and external interfaces could provide the least expensive solution. If belt linkages are used in the drive train, then it is possible that simple linear bearings (e.g. wheels on rails) can be used. This approach can significantly reduce cost and provide a highly reliable, long life bearing system. The weight of the reaction masses may range from 100 kilograms to more than 50,000 kilograms, depending on the size of the WEC buoy and the amount of power to be generated.

Figure 5:
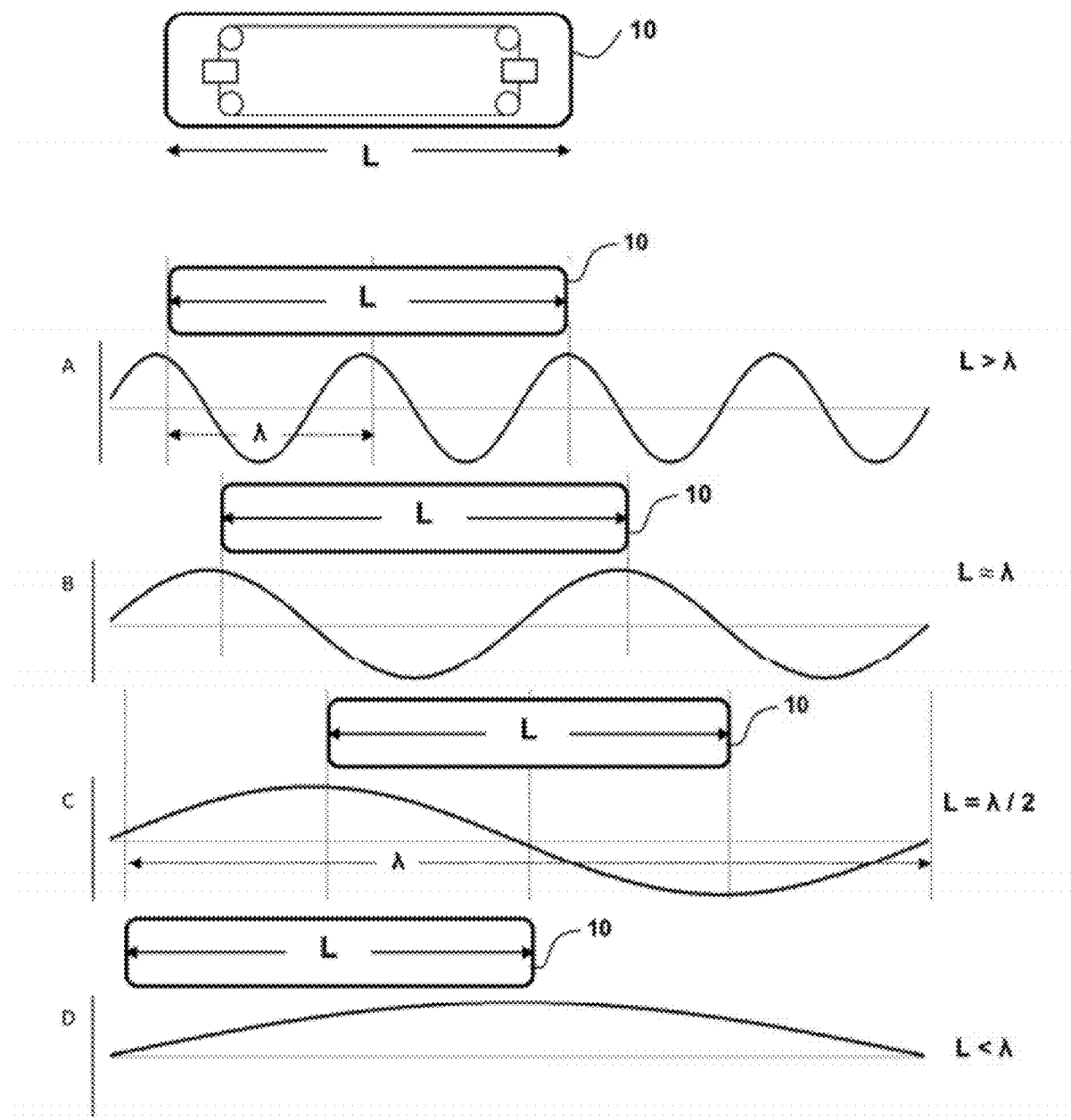
FIG. 5 is a drawing illustrating the effect, and response, of a WEC buoy to waves of different wavelengths.

FIG. 5 shows several possible relationships between the length (L) of the WEC buoy's container and the wave lengths (λ) of the waves. When the length L of the container is equal to, or greater than, the wavelength of the incoming waves, as shown for waveforms A and B the container may pitch back and forth only minimally. That is, if the wave lengths (λ) are smaller than the container's length (L>λ), the buoy does not experience much pitching motion, because the WEC buoy spans several wave crests. As shown for waveform C, the container pitches back and forth most effectively when the length L of the container is approximately equal to one half the wavelengths of the waves. That is, the pitch-driven buoy performs best if the buoy length L is on the order of half a wave length. As shown for waveform D, for waves whose wavelengths are significantly longer than the length ("L") of the container, the container may pitch back and forth only minimally. That is, if the wave lengths are significantly longer than the buoy length (λ>L), the buoy does not experience much pitching motion, because the whole buoy container rides up and down the wave crests and troughs.

Therefore, a factor in selecting the length of the container when using PDWEC devices is the length of the container providing optimum pitching to the incoming waves.

Figure 6:
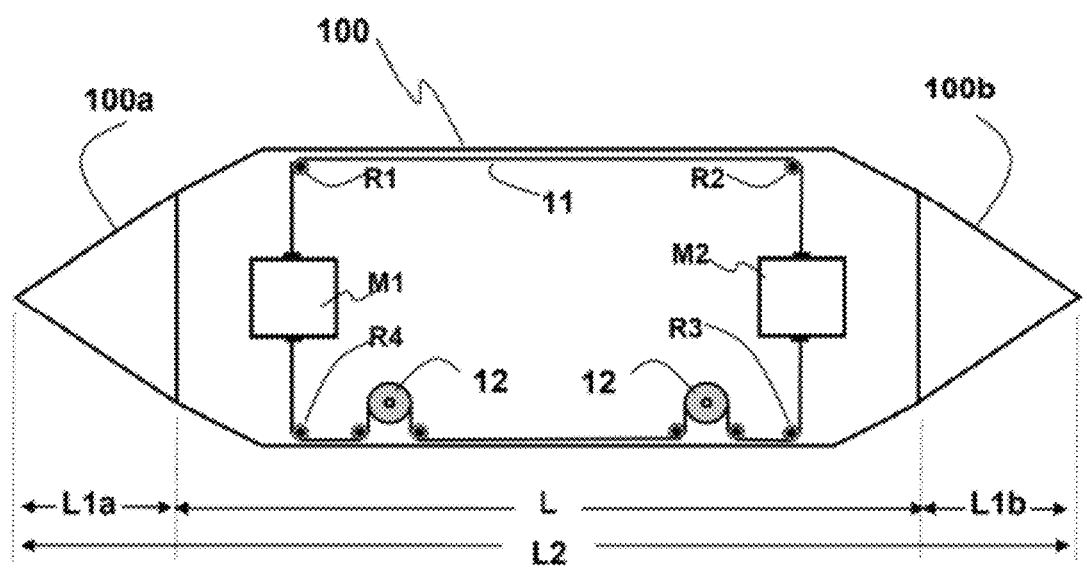
FIG. 6 is a highly simplified cross-sectional drawing showing a modification to the shape of the container of a WEC buoy to enhance its pitching response, in accordance with the invention.

FIG. 6 illustrates that modules 100a, 100b may be added to the container/hull so the hull 100 may be shaped and extended to improve the pitching response of the hull to the waves. The shape of the buoy shell (hull) can be modified, possibly with add-on structures, to enhance the pitching performance of the buoy. Other geometries may be used to improve "pitching" response of the container/hull.

Figure 7:
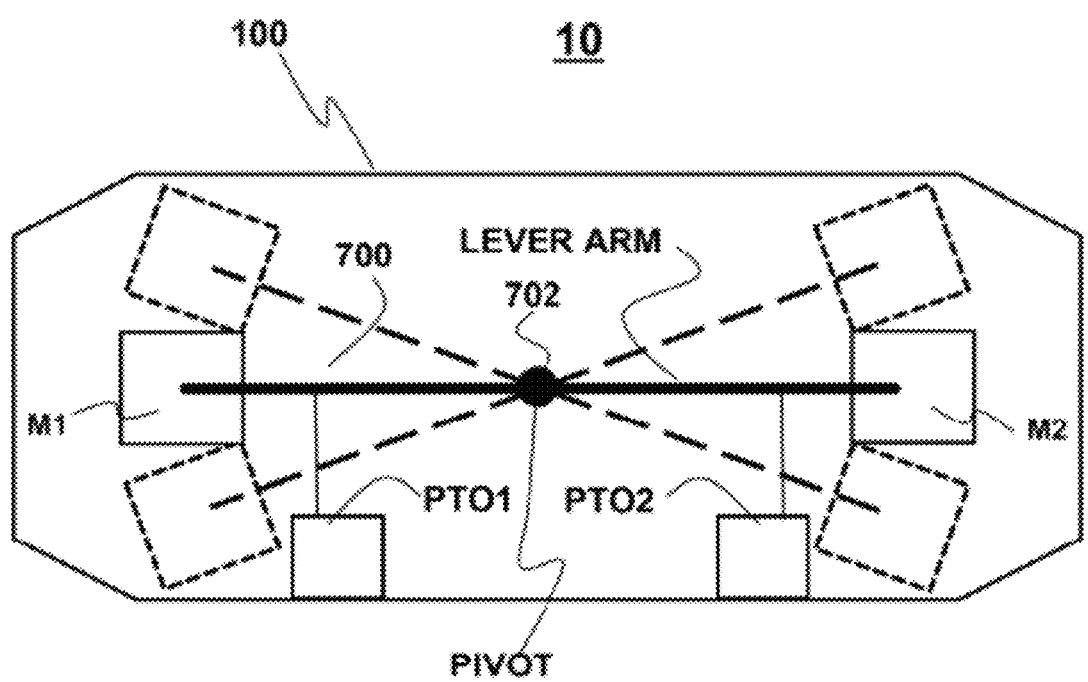
FIG. 7 is a highly simplified cross-sectional drawing showing a "see-saw" levered PDWEC device embodying the invention.

FIG. 7 shows another pitch-driven WEC device embodying the invention. FIG. 7 is a highly simplified diagram showing an implementation of the invention using a lever arm which rests on a centrally located pivot. A reaction mass M1 is connected to one end of the lever arm and a reaction mass M2 is connected to the other end of the lever arm. In this embodiment, the reaction masses (M1, M2) are connected by a rigid beam (lever) 700 connected to a pivot point 702 (located generally in the center of the WEC buoy container 100), such that when one reaction mass moves up, the other reaction mass moves down. PTO devices (PTO1 and PTO2) can be connected to the connecting beam, or could be connected directly to one or both reaction masses. Thus, in response to pitching action of the container 100, the reaction masses cause a seesawing effect which drives the PTOs effectively and efficiently. Note that for this configuration no belts and no (gravitational) springs are needed to interconnect the reaction masses. Also, each ends of the lever arm may be designed to drive its own PTO, which can be operated independently of the other PTOs.

Figures 8A, 8B, 8C:
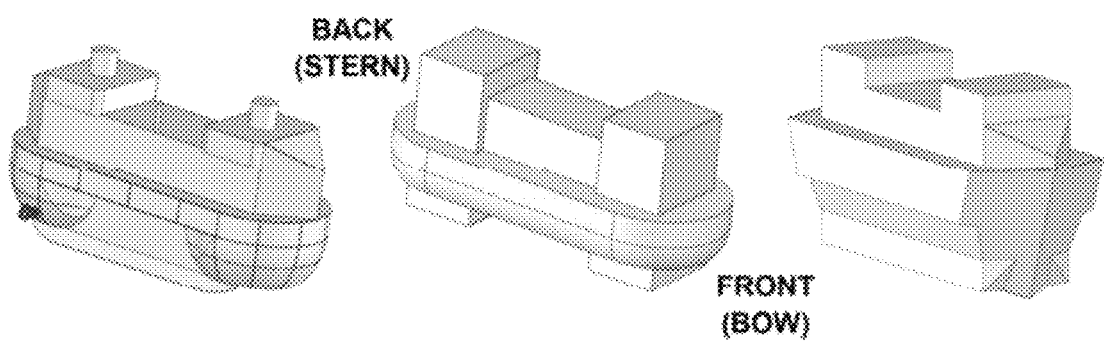
FIGS. 8A, 8B and 8C are isometric drawings of different asymmetrically shaped ship-like hulls/containers designed to be responsive to the pitch of the waves and to enhance the response of PDWEC devices which may be mounted therein.

The container/hull 100 may be shaped like a "tuna can" or a lady's hat box as suggested in FIGS. 1 and 2A. Alternatively, the container/hull may have any suitable shape as shown in FIGS. 8A, 8B and 8C. FIGS. 8A, 8B and 8C are isometric drawings of asymmetrically shaped containers/hulls in which pitch driven WEC devices may be mounted to practice the invention. These structures are preferably operated with their front (narrowest) side pointing towards the incoming waves. FIGS. 8A, 8B and 8C show pitch-driven WEC buoys that have non-cylindrical, non-symmetric shells. In these embodiments, only "fore and aft" reaction masses are used. With only one set of WEC devices the WEC buoy will have a tendency to rotate parallel to the direction of the waves. A steering device (e.g. sail, rudder and propellers, etc.) may be needed to keep the buoy pointed into the waves.

Figure 9A:
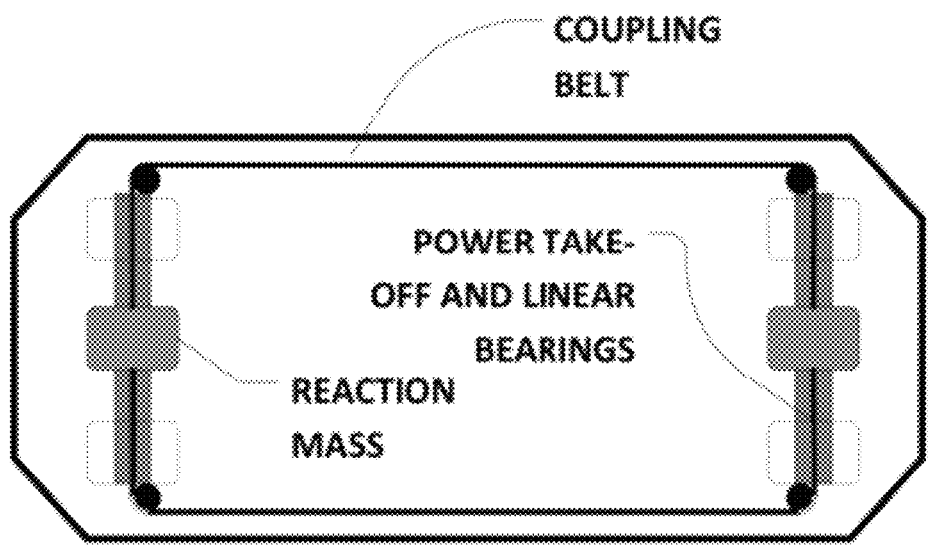
FIGS. 9A and 9B are cross sectional and top views, respectively, of an asymmetrically shaped vessel, as per FIGS. 8A, 8B, and 8C, in which are positioned reaction masses at the "bow" and "stern", where the masses can move linearly up and down.
Figure 9B:
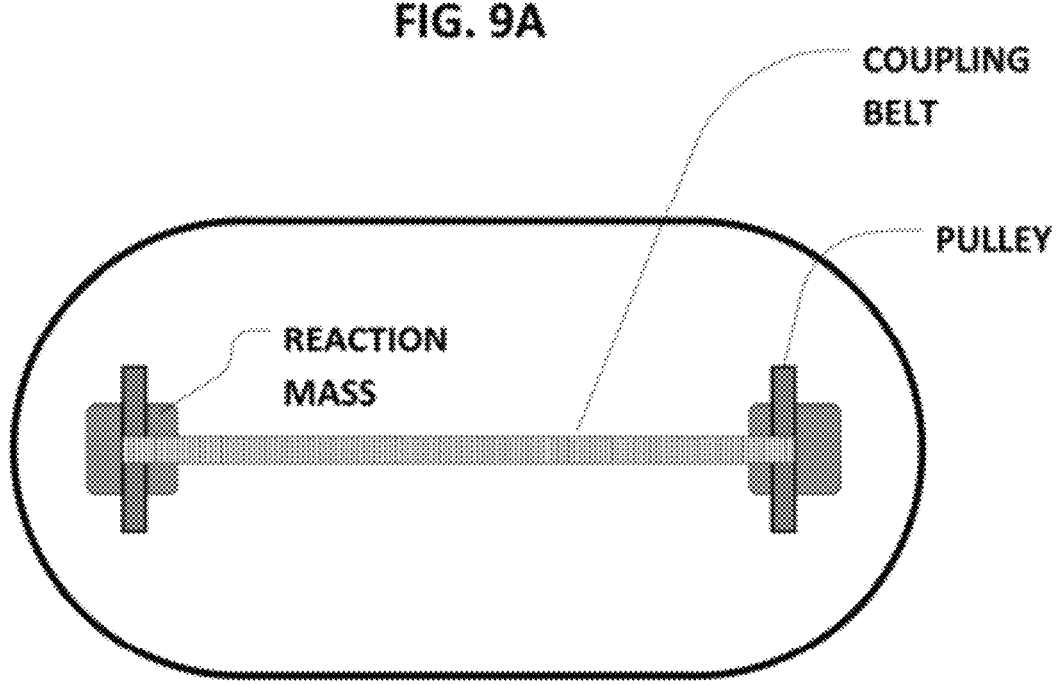

FIGS. 9A and 9B show side and top views, respectively, of a PDWEC device which could be mounted in a container of the asymmetric type shown in FIGS. 8A-8C. FIGS. 9A and 9B illustrate an arrangement where reaction masses placed in the "bow" and "stern" of an asymmetrically-shaped hull move Up and down in response to pitching motion of the asymmetrically-shaped hull.

Figure 10A:
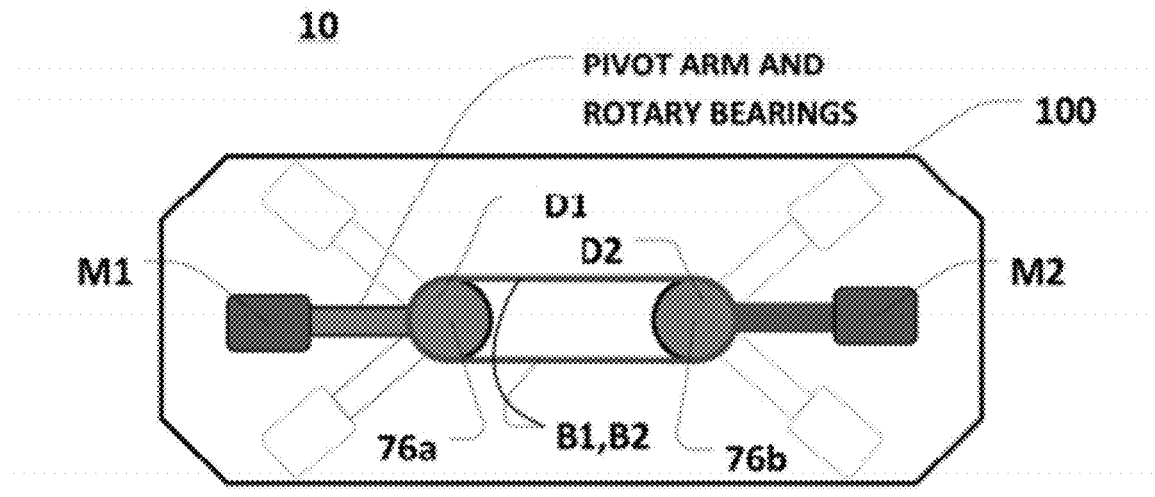
FIGS. 10A and 10B are cross-sectional and top views, respectively, of a PDWEC device embodying the invention including interconnected reaction masses arranged to rotate about pivot points.
Figure 10B:
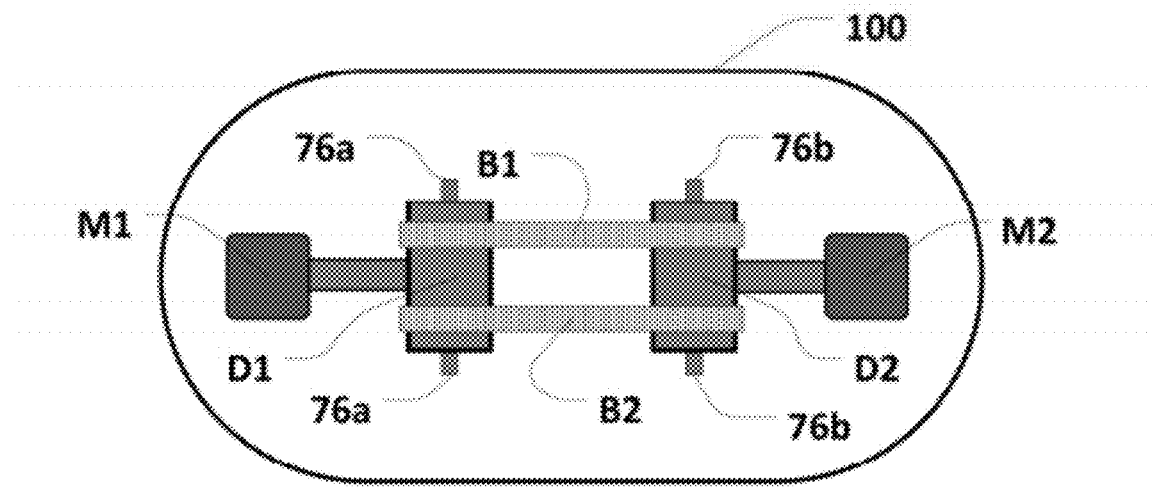

FIGS. 10A and 10B are representative cross-sectional and top views, respectively, illustrating another PDWEC device embodying the invention. A pair of reaction masses (M1, M2) are located at opposite ends of a container 100 (e.g., in the "bow" and "stern" of the container). The reaction masses are attached via pivot arms to respective drums (D1, D2) so they can rotate up and down about their horizontal axis. The drums are mounted on rotatable shafts (76a, 76b) which are attached to the sides of the container 100. Belts (B1, B2) are shown connected around the drums (D1, D2) so the drums move in tandem. The reaction masses move primarily in an up and down motion in response to the pitching motion of the container which does so in response to the pitching motion of the waves. The movement in one direction (e.g., up) by one of the two reaction masses (e.g., M1) is counterbalanced by the movement in the other direction (e.g., down) of the other reaction mass (e.g., M2). The PDWEC device of FIGS. 10A and 10B may be used in symmetrically shaped or asymmetrically shaped hulls. This embodiment is advantageous in that no linear bearing (or guides) or linear PTO are required. Any number and any type of PTO devices may be connected to the reaction masses and/or the drums and/or the belts.

Figure 11A:
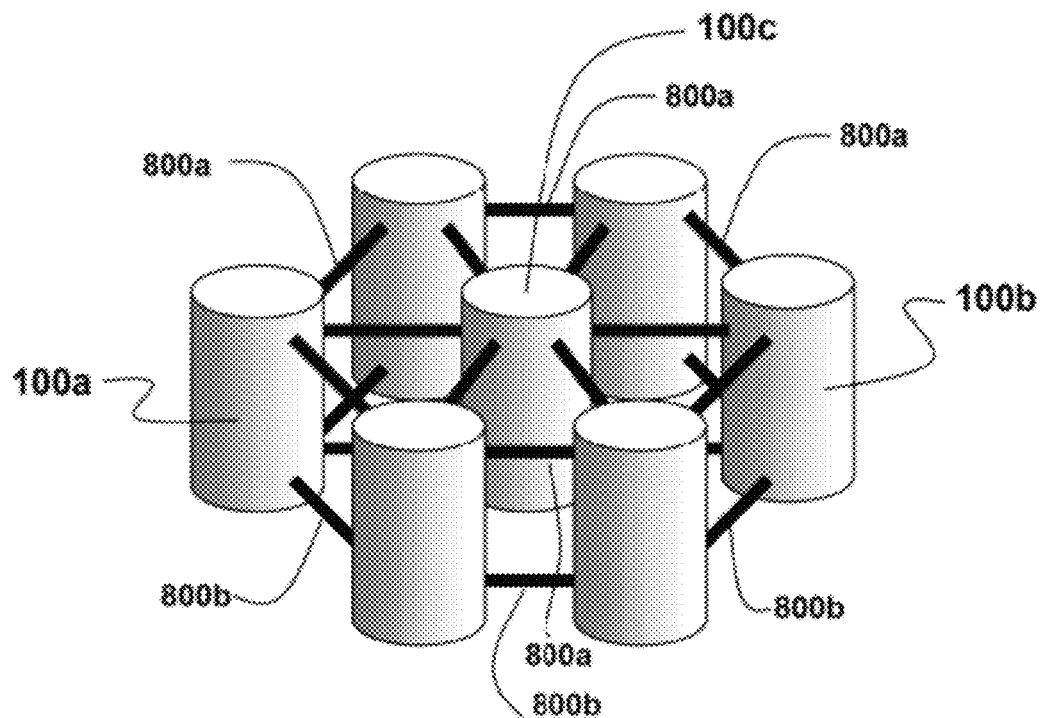
FIG. 11A is a highly simplified isometric view of multi-shell PDWEC devices embodying the invention which are interconnected in accordance with the invention.
Figure 11B:
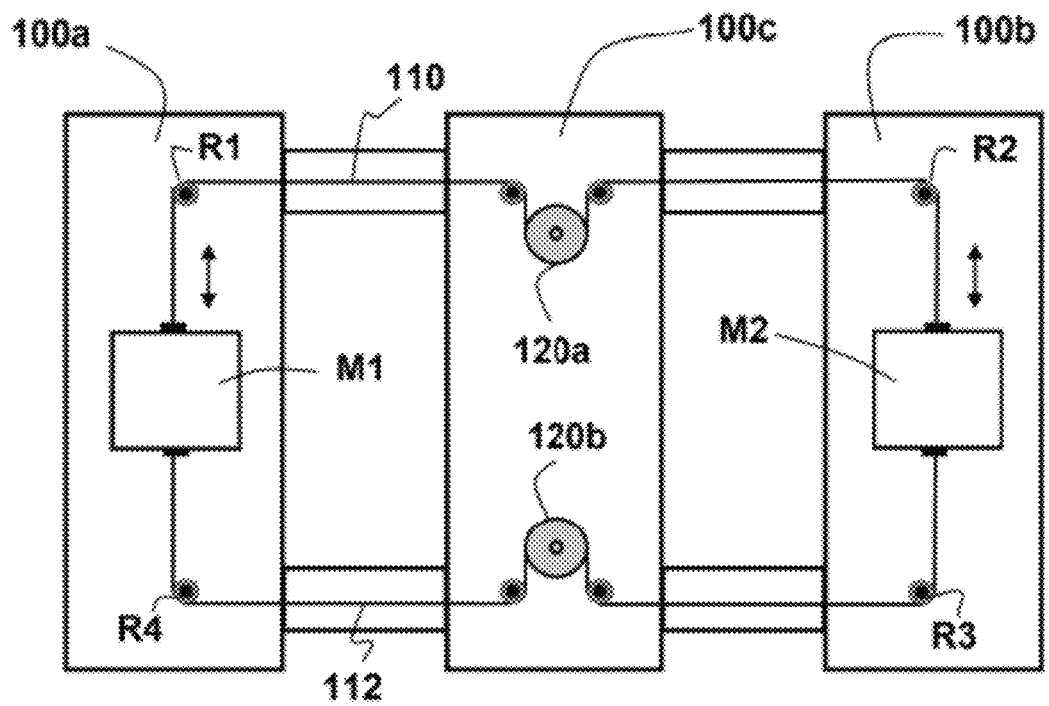
FIG. 11B is a highly simplified cross-sectional diagram of part of FIG. 11A.
Figure 11C:
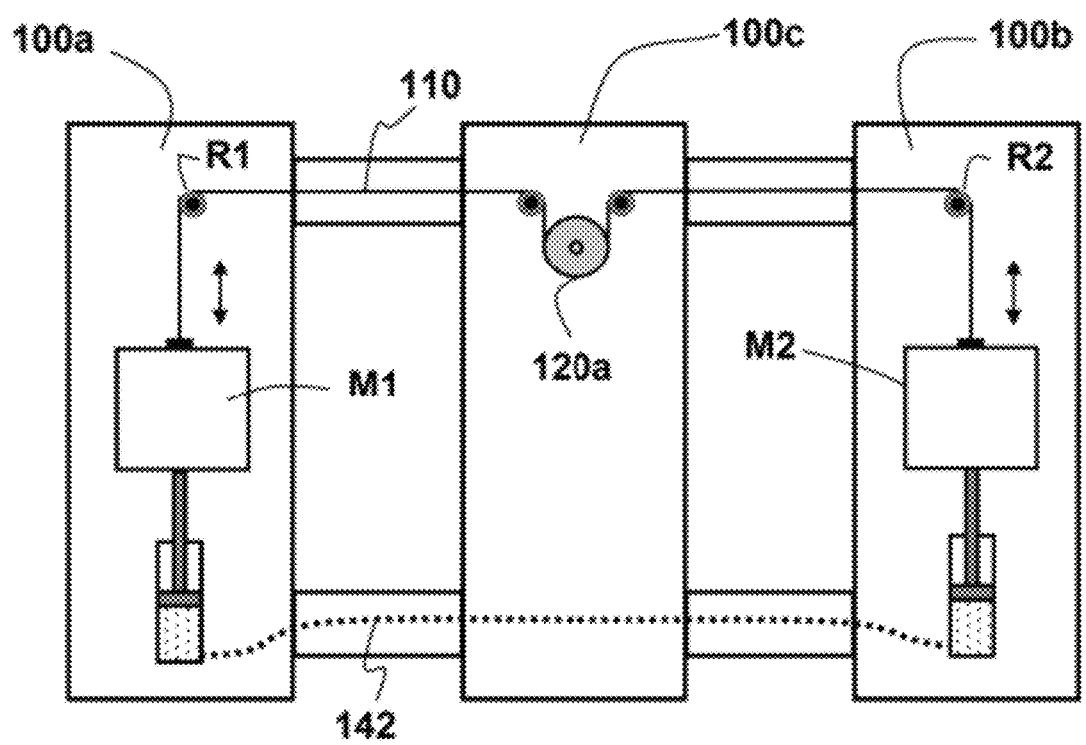
FIG. 11C is a highly simplified cross-sectional diagram of part of FIG. 11A illustrating the use of an hydraulic system for coupling the reaction masses.

FIGS. 11A and 11B illustrate the structure of a multi-shell pitch driven WEC system. The shells/containers (e.g., 100a, 100b, 100c) are structurally interconnected via rigid upper tubes 800a and lower tubes 800b to rigidly maintain the position of all the shells relative to each other. The interconnecting structures could be round tubes. These tubes could also serve to conduct the mechanisms (e.g. belts, cables) that couple the pairs of reaction masses (see FIG. 11B). The multi-shell approach can be configured to provide an optimum pitching motion. For example, the distance between shells could be "tuned" for a long wave length, without requiring an enormous single body hull. The use of multiple shells also simplifies the fabrication of the WEC buoy for cost savings. FIG. 11B shows an embodiment of a PDWEC device in which a pair of reaction masses (M1, M2) is housed in separate shells. That is, M1 can move up and down in shell 100a and M2 can move up and down in shell 100b. The reaction masses are interconnected at their top side via belt 110 and at their bottom side via belt 112. The belts are made to pass through a centrally located shell 100c where they are used to drive electrical generators 120a, 120b. Note that the central shell 100c may function as a pivoting point between shells 100a and 100b to enhance their pitching response. The spacing of the shells can be selected for the optimum spacing of the reaction masses relative to the wavelength of the waves for which the system of FIG. 11A is designed. The PTO for each set of reaction masses could be housed within the outer shells, or could all be housed within a center shell, as shown in FIG. 11B. Tubes connecting the shells can serve as conduits for the mechanical linkages between the pairs of reaction masses and between the reaction masses and their respective PTO's. Alternatively, as shown in FIG. 11C, the interconnecting tubes can be used to enable a hydraulic system (142) to be used to interconnect the reaction masses and drive a PTO system.

Figure 12:
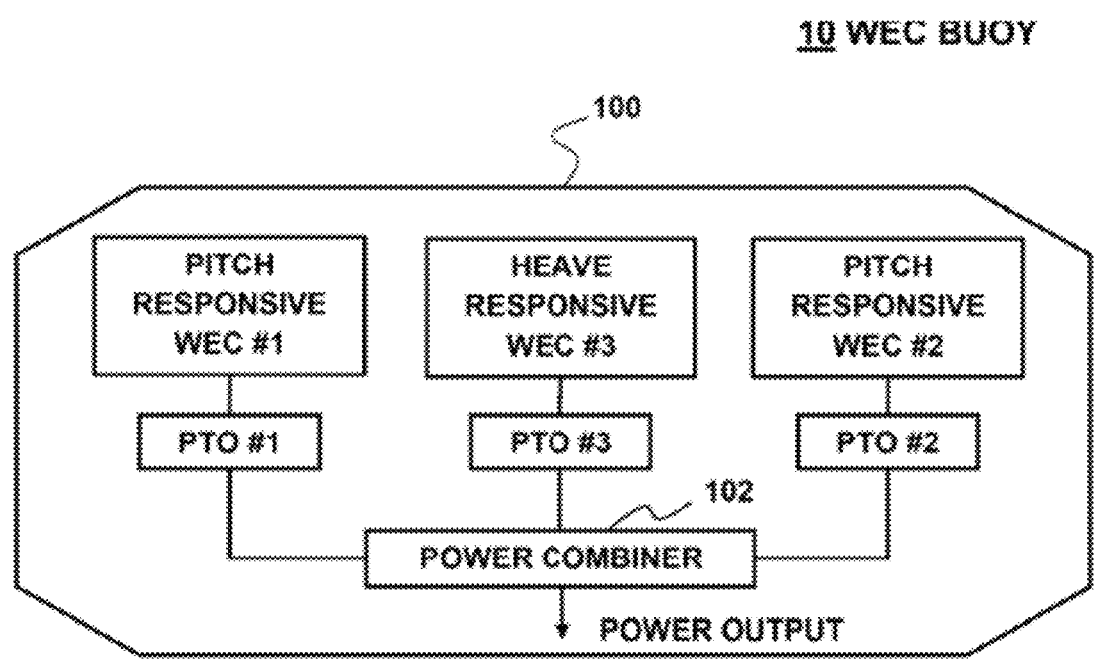
FIG. 12 is a block diagram of a multi-modal WEC buoy in whose hull there is mounted a pitch driven wave energy capture system and a heave responsive wave energy capture system.
Figure 12A:
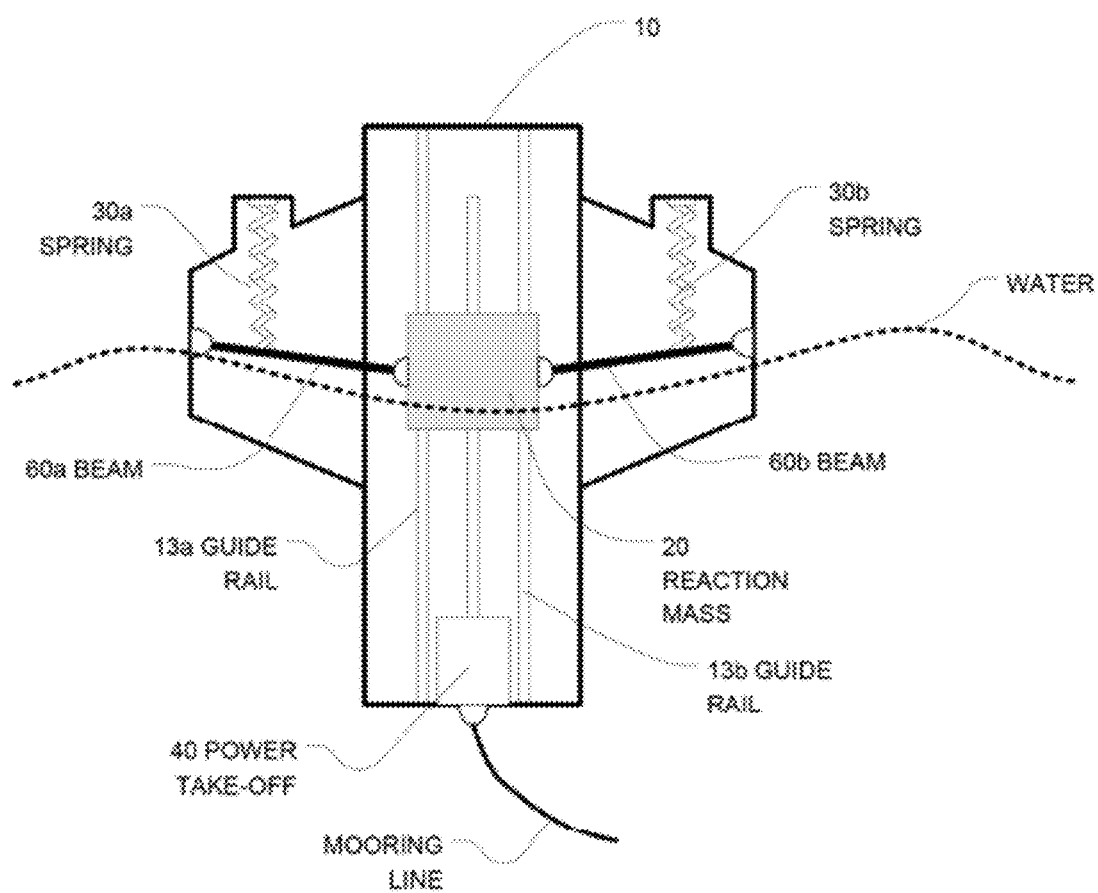
FIGS. 12A, 12B and 12C are highly simplified cross-sectional drawings of WEC devices responsive to heave motion which may be used together with PDWECs in a WEC buoy.
Figure 12B:
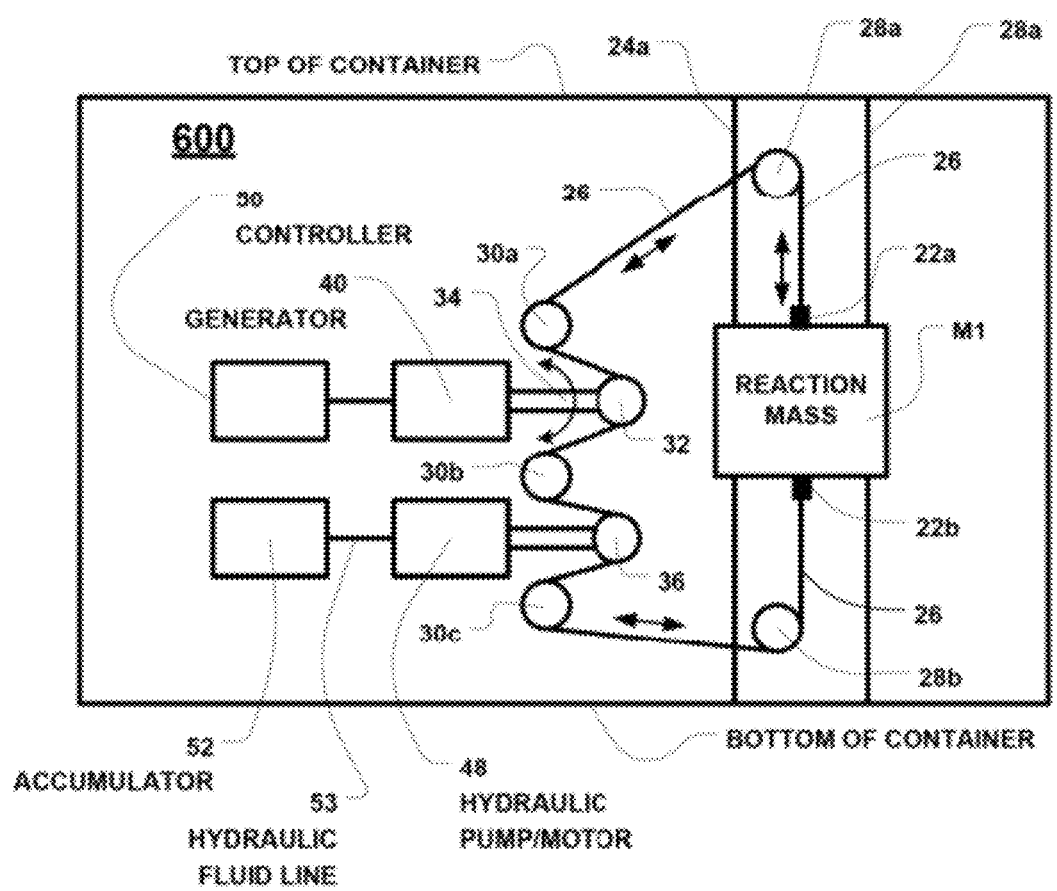
Figure 12C:
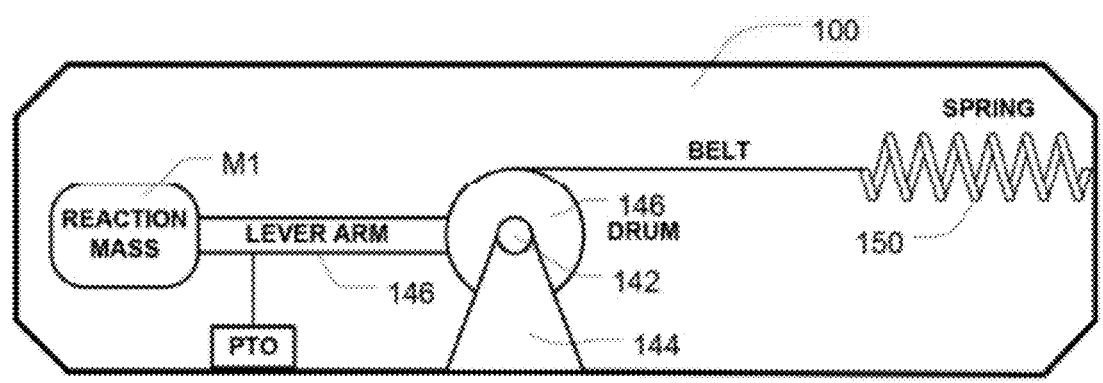

The PDWEC devices are very efficient power converters in response to pitching motion. However, as a general proposition the waves may cause "heaving" as we ell as "pitching" of the container. By way of example, FIG. 5 shows that any container may heave or pitch depending on the wavelength of the waves relative to the length of the container. To optimize energy capture where the wavelength may vary, it is desirable to have a WEC buoy 10 which, as shown in FIG. 12, is capable of generating a power output in response to the pitch forces and to the heave forces of the waves. FIG. 12 is a block diagram showing a multi-mode WEC buoy 10 which includes primarily pitch responsive WEC devices (WEC#1, WEC#2) and a heave responsive WEC device (WEC#3). The heave responsive WEC device(s) may be placed at or near the center of the buoy to capture energy primarily from heave motions. The pitch responsive PDWEC devices are placed away from the center of the buoy (around the outer periphery of the WEC buoy) and preferably at opposite ends of the container/hull 100 to capture energy from pitch motion of the waves. The power outputs of the PDWEC devices and the heave responsive devices can then be combined. The PDWEC devices may be of the type shown in FIGS. 2 (A-D), 7, 10(A, B), 11(A-C) or any WEC device which is capable of responding to pitching or rolling motion. This may even include the devices shown in FIGS. 12A, 12B and 12C. Typically, the heave responsive devices may be of the type shown in FIG. 12A, 12B or 12C. FIG. 12A is a standard mass-on spring type WEC FIG. 12B includes a reaction mass M1 coupled to a generator/motor via a belt 26. The generator can be controlled by a controller 50 and function like a motor. Additionally, a spring function is provided by means of an hydraulic pump/motor 48, coupled via a fluid line 53 to an accumulator 52. FIG. 12C includes a reaction mass M1 connected via lever arm 146 at a drum 146 to which a spring 150 is attached. The reaction mass can rotate about its horizontal postion and drive a PTO to produce useful energy (e.g., electric power). Alternatively, any suitable heave responsive device may be used. Note that the WEC devices of FIG. 12A, 12B or 12C are primarily heave responsive devices. But they may be positioned around the outer periphery of the can 100 to be more responsive to pitching. If so they can also be sued as pitch responsive devices.

Figure 13:
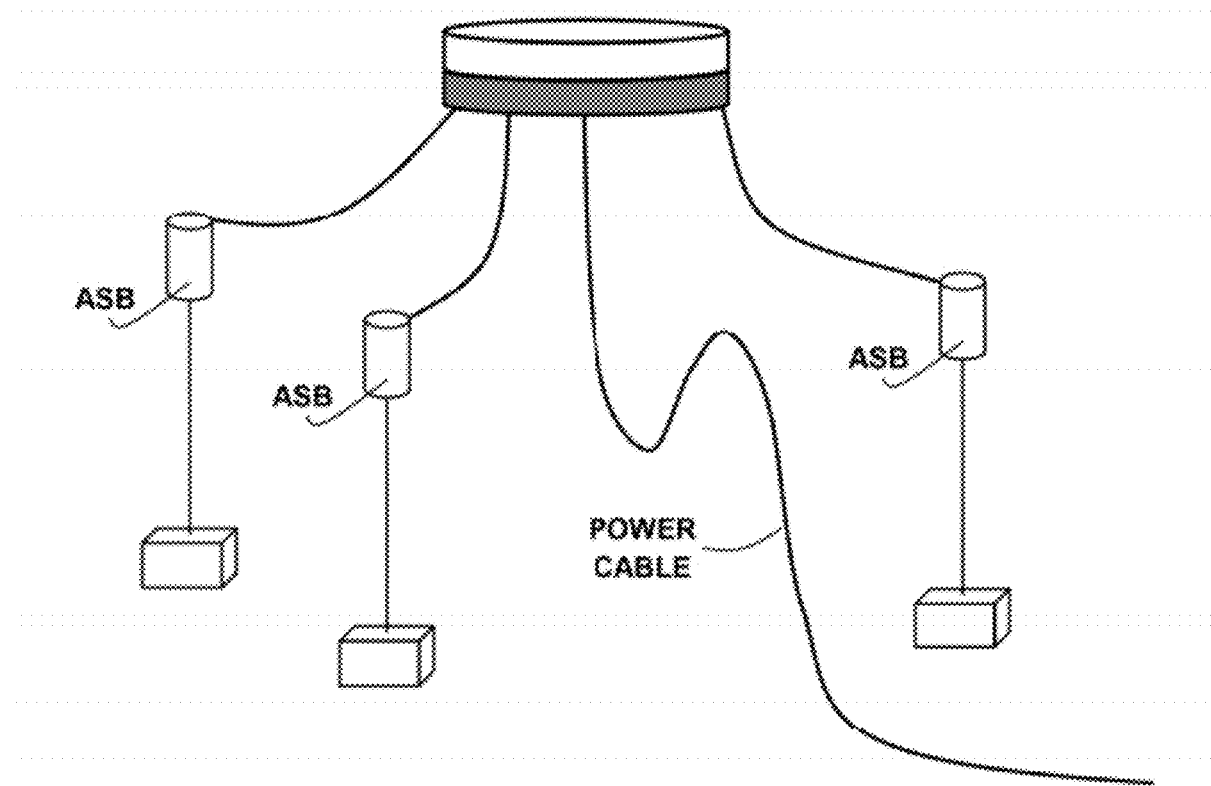
FIG. 13 is a highly simplified diagram showing a mooring arrangement for a WEC buoy to enable it to pitch and/or roll.

FIG. 13 shows a deployment and mooring arrangement for a WEC buoy 10 embodying the invention. A method of mooring the WEC buoy is a three-point mooring system. In a typical three-point mooring system, three gravity anchors equally spaced around the WEC tether three Auxiliary Subsurface Buoys (ASBs). The ASBs are located a safe distance below the surface of the water. The WEC buoy is tethered to each of the three ASBs. The ASBs serve to minimize downward pull on the WEC buoy and also provide energy damping during storms. Because the PD-WEC buoy is mostly out of the water in all sea conditions, it behaves much like a boat on anchor in a storm. So anchored, the WEC buoy 10 can respond in heave and pitch (and roll) enabling the WEC devices contained therein to so respond. This is a significant potential advantage of this technology over other WEC technologies, and is an additional reason why the PDWEC can be an economically viable system.

Figure 14:
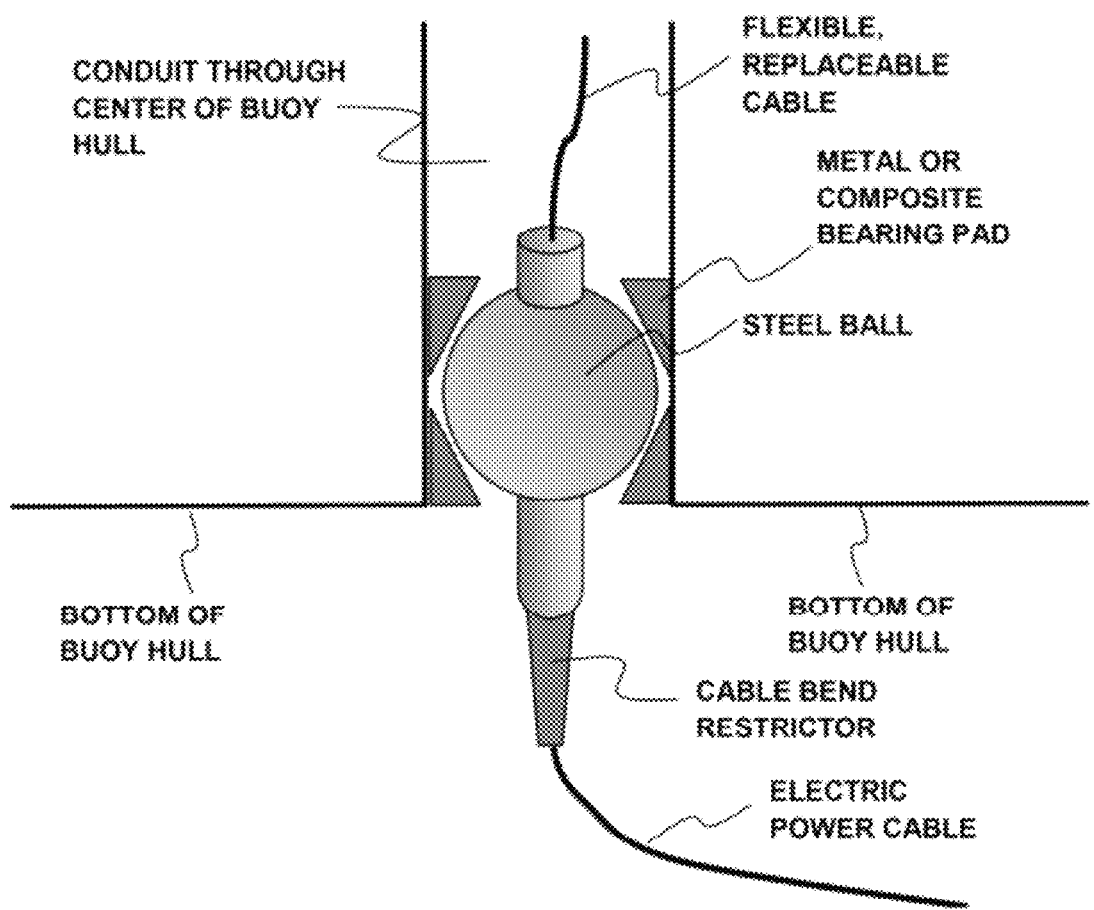
FIG. 14 is a highly simplified cross-sectional drawing showing a ball joint connection to enable the coupling of the electrical power input/output of a WEC buoy to an external system.

FIG. 14 shows a ball and socket joint for enabling an output (or input) cable to be passed between a WEC buoy and an external device. Because the WEC buoy pitches and rolls, a power cable protruding from the bottom of the WEC will see significant rotation in terms of amplitude and quantity. The use of a ball-joint type device can mitigate the problem of frequent and large flexures and therefore extend the life and reliability of the power cable. The inboard end of the ball-joint cable system can be designed to be field-replaceable.

What is claimed is:

1. A wave energy converter (WEC) system comprising:
a container designed to be responsive to wave motion in a body of water; said container having two opposite ends; each end having a top region and a bottom region with a distance between the top and bottom regions defining a travel distance for each end;
at least one wave energy converter device, located within the container, the wave energy converter device including:
(a) a first reaction mass positioned near one end of the container and a second reaction mass positioned near the opposite end of the container;
(b) an interconnecting means coupled to and interconnecting said first and said second reaction masses so each of the masses moves generally up and down in an alternating manner along its respective travel distance such that when one reaction mass moves up the other reaction mass moves down and when the one reaction mass moves down the other reaction mass moves up; and
(c) a power take off device (PTO) responsive to movement of the reaction masses for converting the movement into useful energy;
wherein the interconnecting means includes cabling and a plurality of rollers, the plurality of rollers including a plurality of top rollers, with a respective top roller of the plurality of top rollers being fixedly mounted to said container above each of said first and said second reaction masses, the cabling being connected between the reaction masses and being wound around the plurality of rollers for allowing the reaction masses to move generally up and down in the alternating manner with the cabling moving both vertically up and down and horizontally between the rollers.

2. A wave energy converter (WEC) system as claimed in claim 1, wherein the plurality of rollers further includes a plurality of bottom rollers, wherein a respective bottom roller of the plurality of bottom rollers is located generally below each reaction mass; and
wherein each reaction mass has a top connecting point and a bottom connecting point and wherein the cabling is wound around the top rollers and is connected between the top connecting points of the reaction masses.

3. A wave energy converter (WEC) system as claimed in claim 2, wherein the cabling includes cabling wound around the bottom rollers and connected between the bottom connecting points of the reaction masses.

4. A wave energy converter (WEC) system as claimed in claim 3, wherein the power take off device (PTO) responsive to the movement of the reaction masses is coupled to and driven by the cabling to produce electrical energy.

5. A wave energy converter (WEC) system as claimed in claim 1, wherein said first and second reaction masses together with the interconnecting means and the PTO define a first wave energy converter (WEC) device; and wherein additional, similar, WEC devices are disposed within the container.

6. A wave energy converter (WEC) system as claimed in claim 1, wherein the container has dimensions including a length (L) disposed to face incoming waves, a width (W), and a height (H); and wherein L is equal to, or greater than, W.

7. A wave energy converter (WEC) system as claimed in claim 6, wherein the dimensions and a shape of the container are selected for enhancing pitching motion of the container as a function of the incoming waves in the body of water and for enhancing the movement of the reaction masses in response to the pitching motion of the container.

8. A wave energy converter (WEC) system as claimed in claim 7, wherein the length (L) is greater than the width (W).

9. A wave energy converter (WEC) system as claimed in claim 6, wherein the length (L) of the container is selected to have a value approximately equal to one-half (½) of a wave length of the incoming waves.

10. A wave energy converter (WEC) system as claimed in claim 1, wherein the interconnecting means further includes a hydraulic system located within the container and responsive to the movement of the reaction masses for enhancing the upward movement of one reaction mass and the downward movement in the other reaction mass, and vice versa.

11. A wave energy converter (WEC) system as claimed in claim 1, wherein the container has either a symmetrical or an asymmetrical structure along a horizontal plane.

12. A wave energy converter (WEC) system as claimed in claim 1, wherein said container is fully enclosed.

13. A wave energy converter (WEC) system as claimed in claim 1, wherein said container includes a first section for housing said first reaction mass and a second section for housing said second reaction mass.

14. A wave energy converter (WEC) system as claimed in claim 13, wherein said container includes a third section centered between said first and second sections for housing the PTO.

15. A wave energy converter (WEC) system as claimed in claim 1, further including a heave responsive WEC device located about a center of the container.

16. A wave energy converter (WEC) system comprising:
a container designed to extend along a surface of a body of water and to be responsive to heave motion and to pitching motion of waves in the body of water; said container having two opposite ends, each end having a top region and a bottom region with a distance between the top and bottom regions defining a travel distance for each end;
a heave responsive wave energy converter (WEC) device mounted within, and generally about, a center portion of the container to respond primarily to heave motion of the container;
a number (N) pitch responsive wave energy converter (WEC) devices mounted within the container and generally about an outer periphery of the container to respond primarily to pitch motion of the container; where N is equal to or greater than 1; and
a power take-off (PTO) device coupled to each one of said heave responsive and pitch responsive WEC devices to produce useful energy in response to the heave motion and to the pitch motion;
wherein each pitch responsive WEC device includes
(a) a first reaction mass positioned near one end of the container and a second reaction mass positioned near the opposite end of the container;
(b) an interconnecting means coupled to and interconnecting said first and said second reaction masses so each of the masses moves generally up and down in an alternating manner along its respective travel distance such that when one reaction mass moves up the other reaction mass moves down and when the one reaction mass moves down the other reaction mass moves up; and
wherein the interconnecting means includes cabling and a plurality of rollers, the plurality of rollers including a plurality of top rollers, with a respective top roller of the plurality of top rollers being fixedly mounted to said container above each of said first and said second reaction masses, the cabling being connected between the reaction masses and being wound around the plurality of rollers for allowing the reaction masses to move generally up and down in the alternating manner with the cabling moving both vertically up and down and horizontally between the rollers.

17. A wave energy converter (WEC) system as claimed in claim 16 further including a ball joint coupled to said container for providing a power connection between the PTO devices and an external connection to the container.

* * * * *